Dec. 29, 1953   S. R. JOHNSON ET AL   2,664,218
CAN BAG UNLOADING APPARATUS
Filed June 20, 1949   4 Sheets-Sheet 1
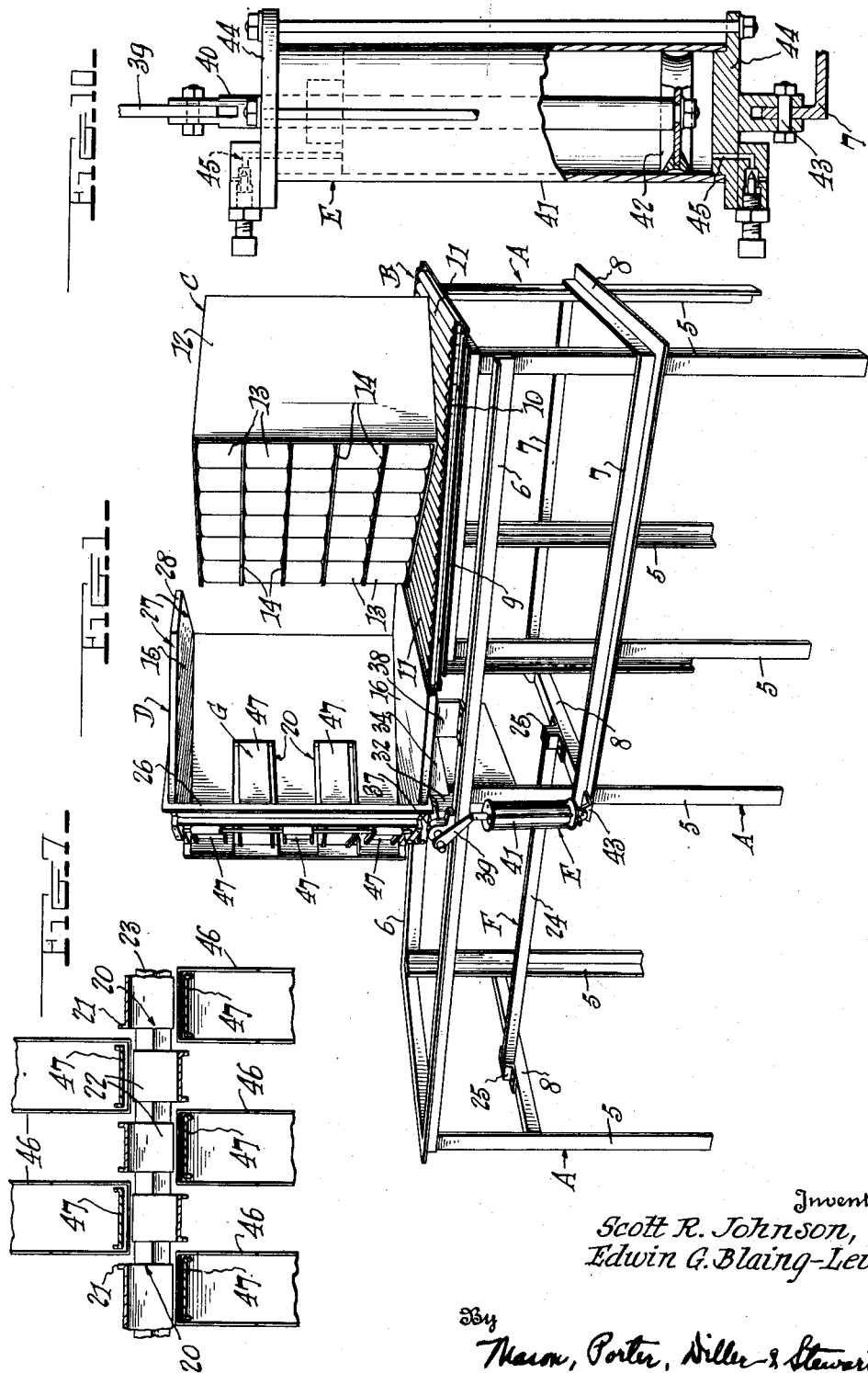
Inventors
Scott R. Johnson, &
Edwin G. Blaing-Leish.
By Mason, Porter, Diller & Stewart
ATTORNEYS

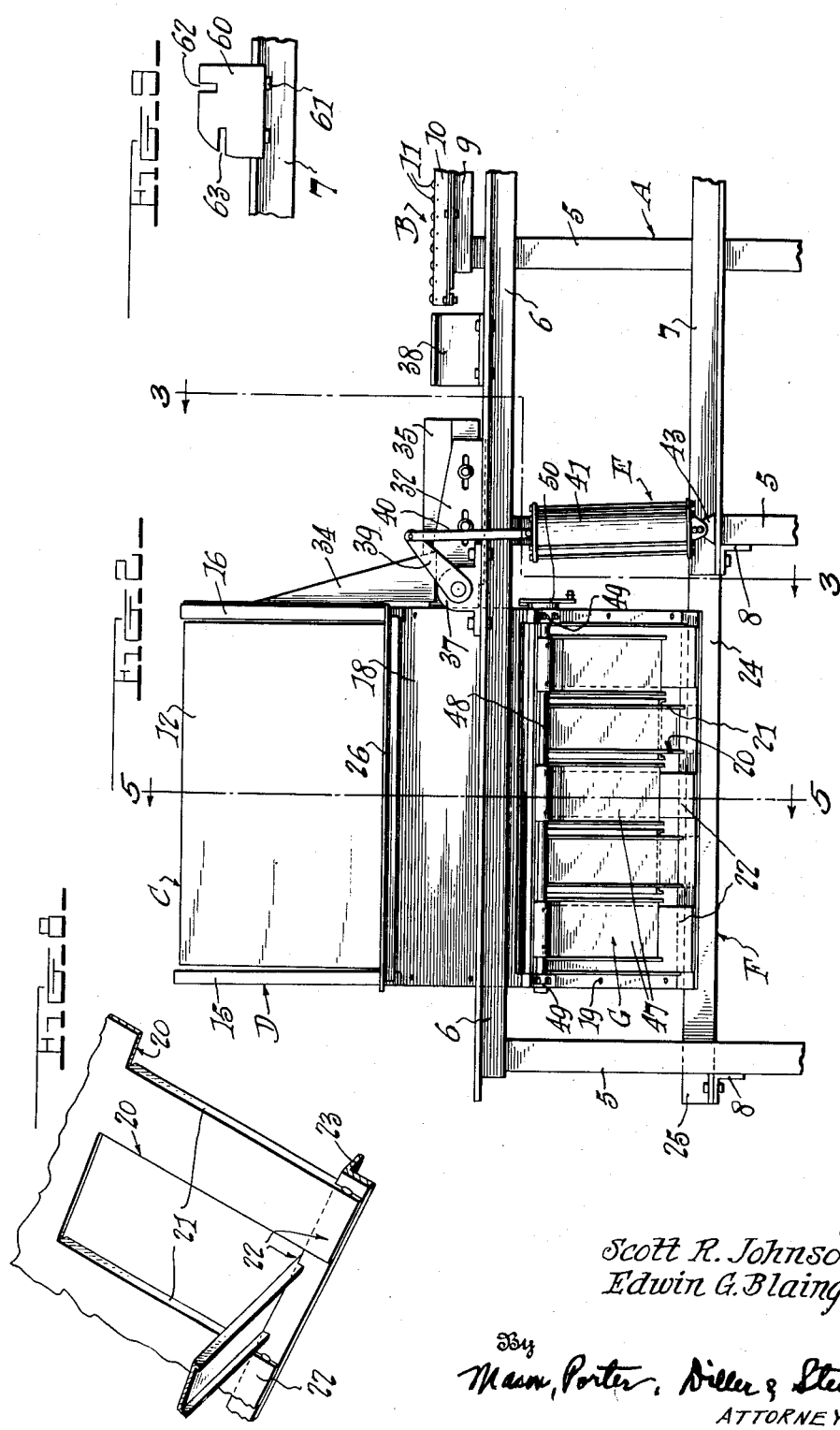

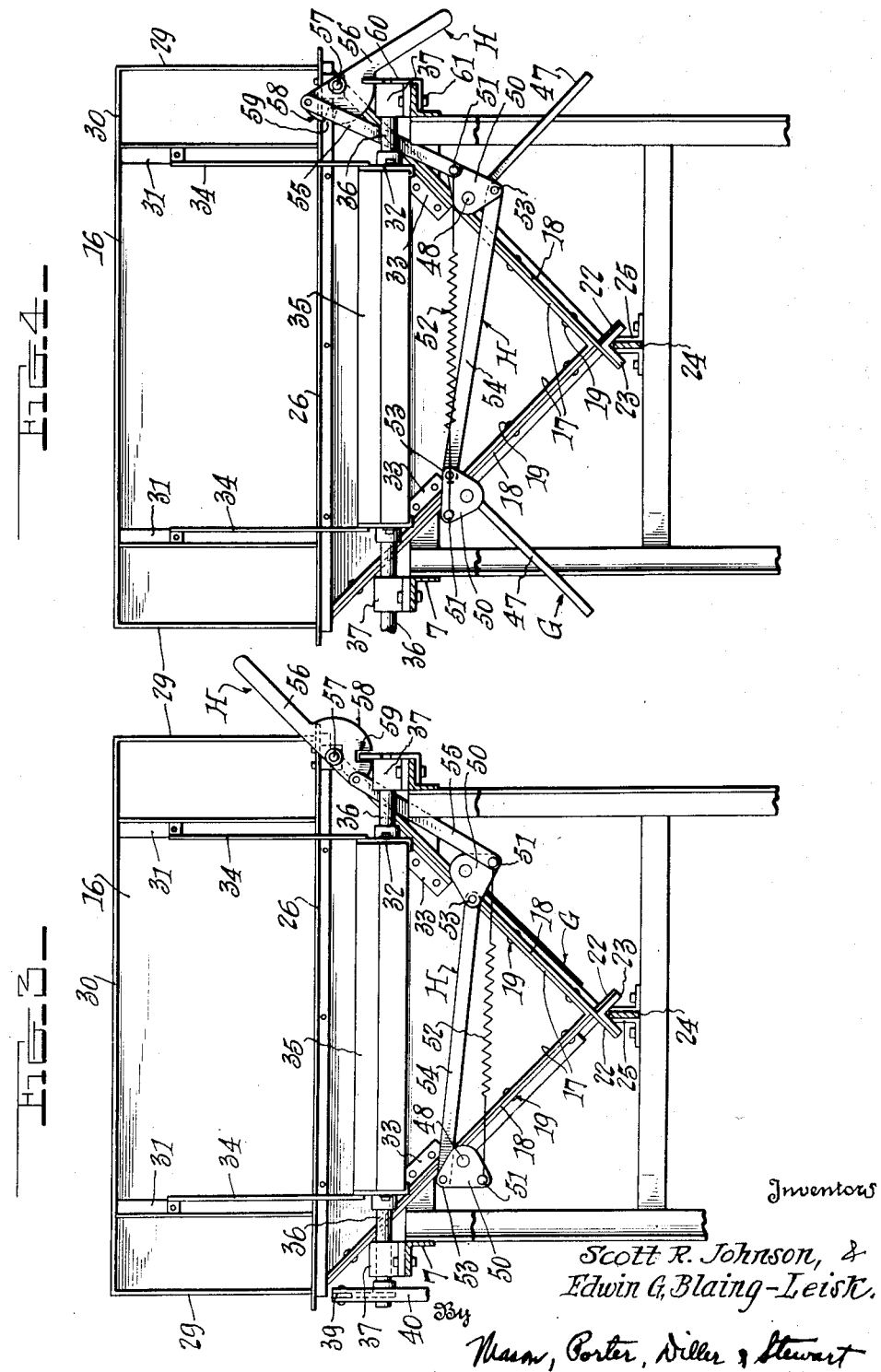

Dec. 29, 1953  S. R. JOHNSON ET AL  2,664,218
CAN BAG UNLOADING APPARATUS
Filed June 20, 1949  4 Sheets-Sheet 4
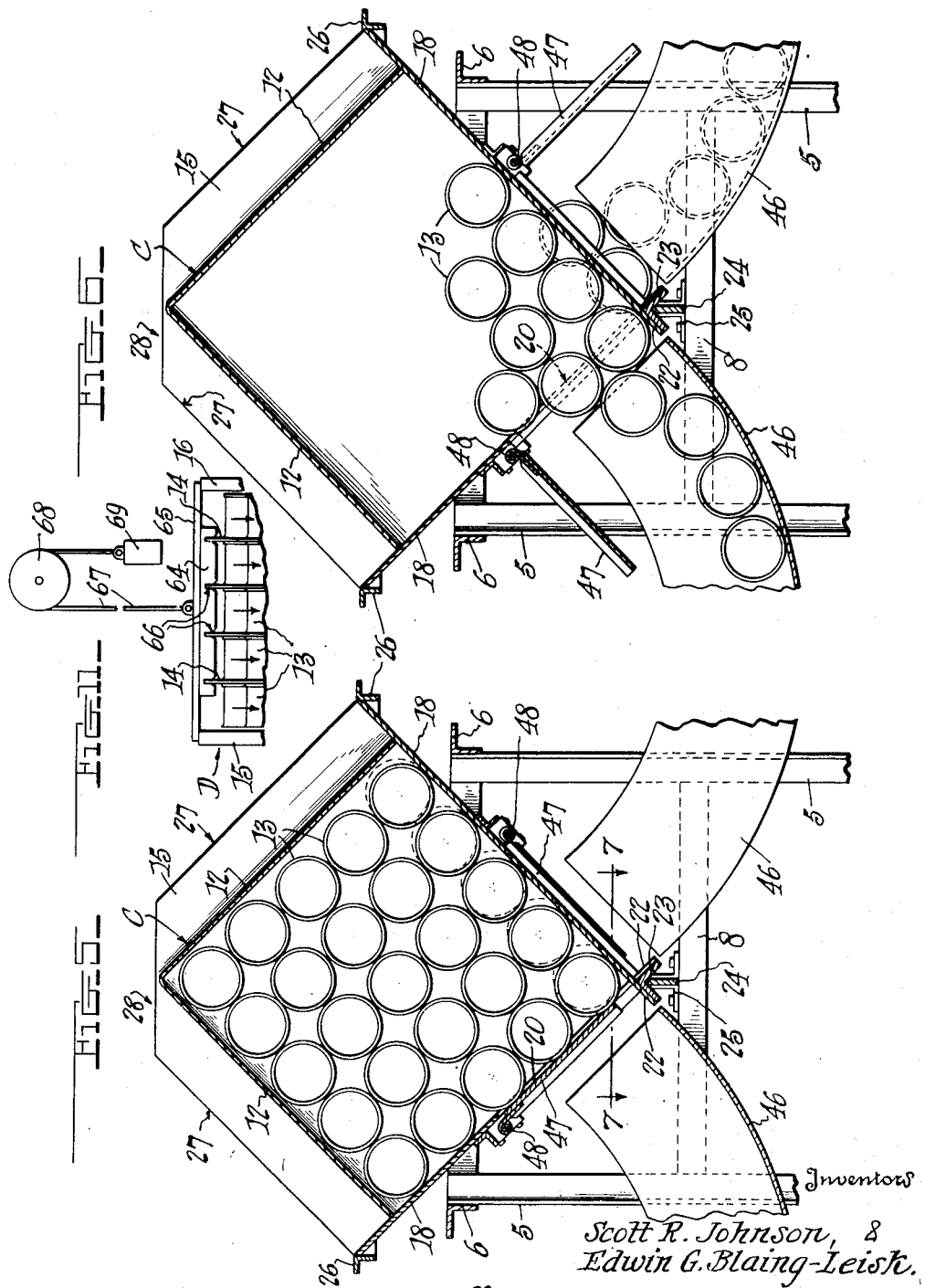
Inventors
Scott R. Johnson, &
Edwin G. Blaing-Leisk.
By
Mason, Porter, Diller & Stewart
ATTORNEYS Patented Dec. 29, 1953

2,664,218

UNITED STATES PATENT OFFICE 2,664,218

CAN BAG UNLOADING APPARATUS

Scott R. Johnson, River Forest, and Edwin G. Blaing-Leisk, Chicago, Ill., assignors to Continental Can Company, Inc., New York, N. Y., a corporation of New York Application June 20, 1949, Serial No. 100,267

12 Claims. (Cl. 214—307)

1

The invention relates generally to the art of manufacturing cans and primarily seeks to provide a novel apparatus for unloading cans from the bags in which they are packaged for storage and distribution to the market.

In the can manufacturing art great progress has been made in the production of efficiently operating body making and bottoming machinery, and cans are manufactured with great rapidity. The production of efficiently operating can handling methods and apparatus have not kept pace, and much wastage of time and labor is entailed in the handling of cans after they have been manufactured. It is commonly known that the cost of handling manufactured cans is greater than the cost of manufacturing the cans. For example, it has long been the practice to hand fork the cans into the cars by which they are transported, and from said cars or conveyor means into storage bins. This can handling practice presented many problems such as the necessity of employing workers skilled in the forking of the cans, of providing runways, or cableways to the cars and from the cars to storage bins, and of providing special, space consuming bins, not to speak of the necessity of so handling the cans seasonally, with resulting shortage of cars. Some progress has been made in relieving these conditions by packaging the cans in bags for shipment and storage, and some novel methods of and apparatus for so packaging the cans have been devised. These last mentioned methods of packaging the cans in bags or self contained units provide marked advantages because no special skill is required in handling the bags, no special storage space is required and the can bags can be handled, loaded and unloaded, as unit packages, rapidly and without the need of using individual can runways or cableways. Moreover, the packaging of the cans in bags permits storage in advance of season, a very valuable asset in relieving car shortage. However, in order to derive full benefit from the packaging of cans in bags, efficient methods and apparatus for unloading the cans from the bags must be made available so as to make cans in such packages practical and attractive to the customer. It is the purpose of the present invention to provide a novel and efficient apparatus for unloading the cans from the bags in which they are packaged, shipped and stored.

An object of the invention is to provide a can bag unloading apparatus including a table whereon to support a bag of cans with the can axes upright while a wall of the bag is removed to expose cans in a direction perpendicular to their axes, a receiver wherein the bag of cans is receivable from said table and having a removable supporting wall opposing the cans exposed through the bag opening, said receiver being shiftable from its bag receiving position into position for placing the cans so that they will discharge by gravity upon removal of the supporting wall, and means for removing the supporting wall to permit the cans to run out.

Another object of the invention is to provide an apparatus of the character stated wherein the supporting wall of the receiver includes a plurality of removable gates, one for each tier of cans in the bag, and in which there is included an individual conveyor for receiving the cans of each tier as they gravitate through the open gates.

Another object of the invention is to provide an apparatus of the character stated in which the shiftable receiver has a V-shaped bottom in which to receive the corner of the bag through which the cans are exposed and on which said bottom the gates are provided, said gates being swingable between closed and open positions, and the receiver being swingable between an elevated, bag receiving position and a lowered, can discharging position.

Another object of the invention is to provide an apparatus of the character stated wherein there are included dash pot means for cushioning the movement of the receiver between its elevated and lowered positions, and counterpoise means constantly tending to hold the receiver in its elevated position.

With the above and other objects in view that will hereinafter appear, the nature of the invention will be more clearly understood by reference to the following detailed description, the appended claims and the several views illustrated in the accompanying drawings.

In the drawings:

Figure 1 is a perspective view illustrating the apparatus, a bag of cans being shown as supported on the receiving table, two sides thereof having been torn away to condition the same for being inserted into the swingably mounted receiver shown in its elevated or bag receiving position.

Figure 2 is a left side elevation of the apparatus shown in Figure 1, the bag receiver being swung down into the position in which the cans are discharged therefrom.

Figure 3 is a vertical cross section taken on the line 3—3 on Figure 2, the bag receiver being shown in the same condition illustrated in Figure 2.

Figure 4 is a view similar to Figure 3, the discharge gates being shown swung open to the can discharging position.

Figure 5 is a vertical cross section taken on the line 5—5 on Figure 2.

Figure 6 is a view similar to Figure 5, the discharge gates being shown swung open to the can discharging position as in Figure 4.

Figure 7 is a fragmentary horizontal section taken on the line 7—7 on Figure 5.

Figure 8 is a fragmentary perspective view illustrating one of the can discharging gateways in the bottom of the bag receiver.

Figure 9 is a detail face view of the bracket which secures the bag receiver against tilting movement when the can discharging gates are being manipulated.

Figure 10 is a detail view illustrating the bag receiver movement cushioning dashpot means in part in elevation and in part in longitudinal section.

Figure 11 is a fragmentary left side elevation illustrating a means for holding the intermediate tier sheets while the cans are running out by gravity.

In the example of embodiment of the invention herein disclosed the apparatus is shown as including a supporting frame structure generally designated A and whereon a table structure generally designated B is included for supporting the bag of cans which is to be unloaded, one thereof being illustrated in place on the table in Figure 1 and generally designated C. On the frame structure is tiltably or swingably mounted a bag receiver generally designated D, said receiver being swingable between an elevated receiving position shown in Figure 1 in which position a bag of cans may be received with great facility from the table, and a lowered discharging position such as is illustrated in Figures 2 through 6 of the drawings. The movement of the receiver D between said elevated receiving and lowered discharging positions is cushioned by a dashpot means generally designated E, and the frame structure A includes a horizontally disposed rest F for firmly fixing the position of and supporting the receiver when it is in its lowered position. It will be noted by reference to Figures 1 and 2 that the receiver includes gate means generally designated G through which the cans may be discharged from the supported bag when the receiver is in the lowered position, and said gate means is actuated by control lever and link means generally designated H.

The frame structure A includes uprights 5 which are connected by upper longitudinal rails 6, lower longitudinal rails 7 and transverse connecting rails 8. The uprights at one end of the frame structure are extended above the upper longitudinal rails 6 and support frame rails 9 whereon are mounted longitudinal rails 10 of the roller table B including the transverse rollers 11 as clearly illustrated in Figures 1 and 2 of the drawings.

Each bag of cans C includes an outer paper shell 12 wherein are contained multiple tiers of cans 13 separated by separator or tier sheets 14 in the manner clearly illustrated in Figure 1. In this disclosure the can bag is shown as made up of five tiers of cans, but it is to be understood that the number of tiers included in each bag will vary according to the size of the cans. It will also be noted that for purposes of simplicity the cans in the tiers are shown arranged row beside row. It is to be understood however that the rows of cans may be nested and staggered or arranged in the manner illustrated in Figure 5 according to the desire of the manufacturer. The nesting and staggering of the can rows is preferable because by this means a more compact and tight package is provided.

The bag receiver D is formed of two parallel end walls 15 and 16, right angular reinforcing flanges 17 being provided at the lower half of each said end wall, and bottom plates 18 being secured as at 19 to said reinforcing flanges to provide a V-shaped bottom in the manner clearly illustrated in Figures 1, 3 to 6 and 8 of the drawings. The bottom plates 18 are provided with cut out gateways 20 with lateral edge portions thereof turned downwardly in the form of reinforcing flanges 21, and it will be noted that the downward extensions of the bottom plates between the gateways are interfitted and overlapped as at 22 over an angle iron reinforcing center piece 23 which is adapted to rest on the longitudinal bar 24 constituting the rest generally designated F and which is supported as at 25 at its ends on the adjacent transverse frame pieces 8. It will be apparent by reference to Figures 2 and 3 through 6 of the drawings that the contact of the receiver angle 23 on the rest bar 24 when the receiver is in its lowered position serves to firmly support the receiver and accurately place or center the same.

The end wall and bottom plate assembly of the receiver D is reinforced by a waist angle 26 which encircles the same in the manner clearly illustrated in Figures 1, 4 and 5 of the drawings. It will also be noted that the end wall 15 has inwardly and upwardly angled edge portions 27 which merge into a top cut-off 28 which is parallel to the waist angle 26, whereas the end wall 16 has upright side angle edges 29 which merge into a top angle 30 similarly bearing parallel relation to said waist angle at the same level as the previously mentioned top cut-off 28.

By reference to Figures 3 and 4 of the drawings it will be observed that two upright reinforcing angles 31 are secured to the upper portion of the end wall 16. Side brackets 32 are secured as at 33 to the flanges 17 of the end wall 16 and are reinforced by brackets 34 secured thereto and to the reinforcing angles 31. The brackets 32 have counterpoise weights 35 adjustably secured thereon, and trunnions 36 project from said brackets in the manner illustrated in Figures 3 and 4. The trunnions are rockably mounted in bearings 37 secured upon the top longitudinal rails 6, and rest brackets 38 also are secured on said rails in position for being engaged by the receiver end wall 16 when the receiver is elevated to its receiving position shown in Figure 1, thereby to place said end wall horizontally at the same level with the top surfaces of the rollers 11.

A crank arm 39 is secured on one of the trunnions 36, and said arm has its free end attached to a plunger 40 which projects downwardly into a dashpot cylinder 41 wherein it is connected with a piston 42. The cylinder 41 is secured as at 43 to one of the lower longitudinal rails 7 in the manner clearly illustrated in Figures 1, 2 and 10 of the drawings. It will be apparent by reference to Figure 10 that each cylinder head 44 is equipped with an adjustable bleed port 45 so as to be effective to cushion or retard upward and downward movement of the plunger and piston 40, 42 thereby to cushion the swinging movement of the receiver D between its elevated receiving position illustrated in Figure 1 and its lowered discharging position shown in Figures 2 and 6. It will also be apparent that the counterpoise weights 35 are so positioned as to constantly tend to swing the receiver to the elevated position shown in Figure 1. The provision of this counterpoise means relieves the operator of much of the effort which would otherwise be necessarily expended in the manipulation of the receiver.

When the receiver D is lowered, each gateway 20 overlies a gravity runway or chute 46 in the manner clearly illustrated in Figures 5, 6 and 7 of the drawings, and each gateway is controlled or normally closed by a gate 47. When the apparatus is set up for handling bags having five tiers of cans therein as herein disclosed there will be five gateways and five cooperating control gates, two being arranged at one side of the V-bottom, and three at the opposite side as will be apparent by reference to Figures 1 and 7. All of the gates 47 at each side are mounted for simultaneous swinging movement, being secured on a rod 48 which is pivoted as at 49 to the respective bottom end wall. By reference to Figures 3 and 4 of the drawings it will be observed that a triangular plate 50 is secured on the end of each of the pivoted rods 48, one corner of each said plate being connected as at 51 with a retractile spring 52, and the spring end connections are so related to the plate pivots as to be effective when the gates are closed as in Figure 3 to yieldably hold them in the closed position, and when opened as in Figure 4 to yieldably hold them in the open position. In other words, the plates 50 and the connected spring means 52 constitute toggle means. The remaining plate corners 53 are connected by a cross link 54 which causes the connected plates 50 and the gates 47 to move in unison. The spring connected corner of one plate 50 is connected by a link 55 with an actuator lever 56 which is swingably mounted as at 57 on the waist angle 26 and is equipped with an arcuate edge portion 58 bearing concentric relation to the lever pivot. The lever edge 58 is provided with a clearance notch 59 disposed to straddle a bracket 60 secured as at 61 to one of the longitudinal rails 6 when the actuator lever and link system is in the position illustrated in Figure 3. It will be apparent by reference to Figures 3, 4 and 9 that the bracket 60 is equipped with an uprightly disposed notch 62 and a horizontally disposed notch 63 adapted to receive the arcuate edge 58 of the actuator lever 56 at any time said lever 56 is swung in the manner illustrated in Figure 4 to effect an opening of the can discharging gates 47, whether it be when the receiver is in the elevated receiving position shown in Figure 1, at which time the bracket notch 63 will be effective, or when the receiver is in its lowered, can discharging position shown in Figure 4. The bracket notches 62 and 63 thus make it impossible to swing the receiver while the gates 47 are open.

In the unloading of bags the operator swings the receiver D to the elevated, receiving position shown in Figure 1, in which position the end wall 16 of the receiver will rest upon the brackets 38 close to the roller table 11 so as to in effect form a horizontal continuation thereof. A bag of cans C is mounted on the table and two converging walls or sides thereof toward the V-bottom of the receiver are removed in the manner clearly illustrated in Figures 1, 5 and 6 of the drawings. After the bag wall portions have been removed to expose the cans the bag is moved into the receiver so that the V-bottom structure of the receiver including the gates 47 will oppose the exposed cans and hold them in position. Thereafter the operator swings the receiver D to the lowered, can discharging position shown in Figures 5 and 6 wherein the receiver reinforcing angle 23 rests upon and is centered over the rest bar 24 of the frame structure. As the receiver is initially brought into the lowered, can discharging position the parts will be positioned as illustrated in Figure 3, the can discharging gates 47 being closed.

While it is possible to leave the bag in the receiver after said receiver has been lowered to the can discharging position, in which case the cans will run out by gravity through the opening formed in the bag by removal of wall portions thereof, and through the receiver bottom gates, it is preferred that the bag be removed before the gates are opened, leaving only the bag complement of cans in the receiver with the tier sheets interposed between the tiers.

The actuator lever notch 59 permits the swinging of the receiver when the gates 47 are closed, and by manipulating said lever, or moving the same to the position illustrated in Figure 4, the arcuate edge 58 thereof travelling through the bracket notch 62, the lever and link devices H may be adjusted to swing the gates 47 to the open position illustrated in said Figure 4. By thus removing the supporting gate portions of the V-bottom structure of the receiver the several tiers of cans will simultaneously run by gravity, out through the opening formed in the bag 12 and through the several gateways 20, or through the gateways alone if the bag has been removed, into the individual delivery conveyors or chutes 46, the gates at opposite sides of the center line of the apparatus delivering the cans in opposite directions in the manner clearly illustrated in Figure 6.

If desired, means may be provided for holding the intermediate tier sheets 14 in position while the cans are running out by gravity in the manner clearly illustrated in Figure 11. For this purpose there may be provided a tier sheet holder block 64 having a support piece 65 extending from the ends thereof in position for resting upon the top surfaces of the receiver end walls 15 and 16. The block 64 is equipped with a plurality of sheet holding notches 66 and is supported at the lower end of a cord 67 which passes over a pulley 68 and has a counterweight 69 attached to the other end thereof. As the discharge of the cans is initiated the sheet holder 64 is pushed down by the operator between the tier sheets 14 so that the intermediate tier sheets enter the slots 66 until the support piece or extension 65 rests on the side walls 15 and 16 of the receiver. The tier sheets are thus prevented from bending over and binding the cans as they are being discharged.

After the cans have been discharged in the manner previously described, the lever 56 is returned to the position illustrated in Figure 3 to effect a closure of the gates 47, and the receiver is returned to its elevated position as illustrated in Figure 1 to receive another bag of cans.

While one example of apparatus embodying the invention and adapted for the practicing of the described method is disclosed herein it is to be understood that variations in said apparatus may be made without departing from the spirit and scope of the invention as defined in the appended claims.

We claim:
1. In apparatus for unloading cans from a bag wherein the cans are arranged with their axes in parallel relation and in multiple independent tiers, a receiver in which to receive a bag of cans from which a wall of the bag has been removed to expose cans at their sides and including a V-shaped bottom in which to receive a corner of the bag wherein the cans are exposed at their sides and at least one end wall bearing perpendicular relation to said bottom, means mounting said receiver for tilting movement between an elevated position in which said end wall is substantially horizontally disposed for receiving a bag of cans and a lowered position in which the apex of the bottom V is substantially horizontally disposed, discharge gateway means formed in at least one V-bottom wall, and gate means controlling the gateway means normally disposed to hold cans in the bag but displaceable to allow all of the cans in the several tiers to run out simultaneously through said gate means by gravity action.

2. Apparatus as defined in claim 1 in which there are included dash pot means for cushioning the movement of the receiver between its elevated and lowered positions, and counterpoise means constantly tending to hold the receiver in its elevated position.

3. Apparatus as defined in claim 1 in which there is included a table on which to receive the can bags with the cans upright therein while the bag wall portion is being removed to form the discharge opening and before the bag is placed in the receiver, said table being located on the same level with and close to the receiver end wall when it is in the substantially horizontal receiver elevated position so that can bags can be conveniently pushed from the table onto said end wall.

4. In apparatus for unloading cans from a bag wherein the cans are arranged with their axes in parallel relation and in multiple independent tiers, a receiver in which to receive a bag of cans from which a wall of the bag has been removed to expose cans at their sides and including a V-shaped bottom in which to receive a corner of the bag wherein the cans are exposed at their sides and at least one end wall bearing perpendicular relation to said bottom, means mounting said receiver for tilting movement between an elevated position in which said end wall is substantially horizontally disposed for receiving a bag of cans and a lowered position in which the apex of the bottom V is substantially horizontally disposed, said V-bottom walls having a multiple of can discharging gateways formed therein, one for each can tier and alternated in opposite walls of the V, a gate swingably mounted on the receiver for controlling each said gateway, and means for simultaneously actuating all gates to normally hold them closed in a can retaining position, or in open position to free the cans and allow all tiers to run out simultaneously through said gates by gravity action.

5. Apparatus as defined in claim 4 in which the gate actuating means includes lever and link devices for shifting the gates between open and shut positions, and spring connected toggle plate means effective to yieldably hold the gates in both open and closed positions.

6. Apparatus as defined in claim 4 in which the gate actuating means includes lever and link devices for shifting the gates between open and shut positions, and cooperating notched lever and stationary bracket means effective to secure the receiver against tilting movement as the gates are being manipulated.

7. Apparatus as defined in claim 4 in which there is included an individual conveyor for receiving the cans of each tier as they gravitate through the bag opening and the respective gate.

8. Apparatus as defined in claim 4 in which there is included an individual conveyor for receiving the cans of each tier as they gravitate through the respective gate, dash pot means for cushioning the movement of the receiver between its elevated and lowered positions, and counterpoise means constantly tending to hold the receiver in its elevated position.

9. In an apparatus for unloading cans from a bag wherein the cans are arranged with their axes in parallel relation and in multiple tiers, a table whereon to support a bag of cans with the can axes upright while a wall of the bag is removed to expose cans at their sides, a receiver tiltably mounted to be swingable between a bag receiving position and a can discharging position, said receiver including an end wall disposed horizontally when the receiver is in its receiving position to receive a can bag on a level with and close to the table so that a can bag can be readily pushed thereonto, and a V-shaped bottom disposed uprightly to receive the bag portion with the exposed sides of the cans when the receiver is in its receiving position and which is disposed horizontally when the receiver is swung to its can discharging position, and removable door means in at least one V-bottom wall and removable to allow can tiers to roll out of the receiver over the V-bottom wall opposite and converging toward said door means.

10. Apparatus as defined in claim 9 in which the door means includes an individual door for each individual tier, and wherein there is included an individual conveyor for receiving the cans of each tier as they gravitate through the respective open doors.

11. In apparatus for unloading cans from a bag wherein the cans are arranged with their axes in parallel relation and in multiple independent tiers, a table whereon to support a bag of such cans with the can axes upright while a wall of the bag is removed to expose cans at their sides, a receiver wherein the bag of cans is receivable from said table and having removable supporting wall means opposing the exposed can sides, said receiver being shiftable between a can bag receiving position and a can discharging position and including an end wall disposed when the receiver is in position to receive a can bag on a level with and close to the table so that a can bag can be readily pushed thereonto, and a V-shaped bottom in which to receive the bag portion with the exposed sides of the cans, said removable supporting wall means comprising a plurality of removable gates in said V-shaped bottom, one for each tier of cans and there being included an individual conveyor for receiving the cans of each tier as they gravitate through the respective open gate.

12. In apparatus for unloading cans from a bag wherein the cans are arranged with their axes in parallel relation and in multiple independent tiers, a table whereon to support a bag of such cans with the can axes upright while a wall of the bag is removed to expose cans at their sides, a receiver wherein the bag of cans is receivable from said table and having removable supporting wall means opposing the exposed can sides, said receiver being shiftable between a can bag receiving position and a can discharging position and including an end wall disposed when the receiver is in position to receive a can bag on a level with and close to the table so that a can bag can be readily pushed thereonto, and a V-shaped bottom in which to receive the bag portion with the exposed sides of the cans, said removable supporting wall means comprising a plurality of removable gates placed in alternating relation at opposite sides of the V-shaped bottom, one for each tier of cans, and there being included a row of gravity chutes extending along each side beneath the V-shaped bottom when it is in discharge position to receive the can tiers as they gravitate through the respective open gates.

SCOTT R. JOHNSON.
EDWIN G. BLAING-LEISK.

References Cited in the file of this patent

UNITED STATES PATENTS

| Number | Name | Date |
|---|---|---|
| 348,164 | Judson | Aug. 24, 1886 |
| 1,487,076 | Pilley | Mar. 18, 1924 |
| 1,694,897 | Washburn | Dec. 11, 1928 |
| 1,700,944 | Loew | Feb. 5, 1929 |
| 1,906,126 | Mott | Apr. 25, 1933 |